US008803657B1

(12) United States Patent
Behbehani

(10) Patent No.: US 8,803,657 B1
(45) Date of Patent: Aug. 12, 2014

(54) RFID-MECHANICAL DUAL-MODE ENTRY KEY

(71) Applicant: Fawzi Q. M. A. O. A. Behbehani, Salwa (KW)

(72) Inventor: Fawzi Q. M. A. O. A. Behbehani, Salwa (KW)

( * ) Notice: Subject to any disclaimer, the term of this patent is extended or adjusted under 35 U.S.C. 154(b) by 0 days.

(21) Appl. No.: 13/951,394

(22) Filed: Jul. 25, 2013

(51) Int. Cl.
*G05B 19/00* (2006.01)
*G05B 23/00* (2006.01)
*G06F 7/00* (2006.01)
*H04Q 5/22* (2006.01)
*G08B 1/08* (2006.01)
*B60R 25/02* (2013.01)
*E05B 49/00* (2006.01)
*B60R 25/00* (2013.01)

(52) U.S. Cl.
USPC ....... 340/5.64; 340/5.61; 340/5.66; 340/5.72; 340/10.32; 340/539.11; 70/252; 70/278.3; 70/256; 70/237

(58) Field of Classification Search
USPC ............... 340/5.64, 5.66, 5.67, 5.7, 5.72, 5.1, 340/426.28, 5.3; 70/252, 278.3, 50, 413, 70/278; 455/420, 552.1, 440, 456.1, 101
See application file for complete search history.

(56) References Cited

U.S. PATENT DOCUMENTS

| | | | |
|---|---|---|---|
| 6,035,677 A * | 3/2000 | Janssen et al. | 70/278.3 |
| 7,843,312 B2 * | 11/2010 | Eskildsen et al. | 340/5.64 |
| 7,894,810 B2 | 2/2011 | Feher | |
| 2002/0047777 A1 * | 4/2002 | Casden | 340/10.32 |
| 2003/0184432 A1 * | 10/2003 | Waring et al. | 340/5.66 |
| 2005/0012594 A1 * | 1/2005 | Shim | 340/5.72 |
| 2006/0015233 A1 * | 1/2006 | Olsen et al. | 701/50 |
| 2006/0266089 A1 * | 11/2006 | Dimig | 70/252 |
| 2009/0002153 A1 * | 1/2009 | Berstis et al. | 340/539.11 |
| 2009/0153294 A1 * | 6/2009 | Katagiri et al. | 340/5.61 |
| 2012/0272696 A1 | 11/2012 | Hill | |
| 2013/0200151 A1 * | 8/2013 | Backes et al. | 235/439 |

FOREIGN PATENT DOCUMENTS

WO   WO 2005/010719 A2   2/2005

* cited by examiner

*Primary Examiner* — Jennifer Mehmood
*Assistant Examiner* — Mirza Alam
(74) *Attorney, Agent, or Firm* — Richard C. Litman

(57) ABSTRACT

The RFID-mechanical dual-mode entry key includes a key blade attached to and extending away from a housing. A double-pole, double-throw (DPDT) switch is disposed on the key blade housing. A microantenna disposed in the housing is connected to the switch. An unlock passive Radio Frequency microcircuit disposed in the key blade housing is operably connected to a first pole of the DPDT switch to activate the unlock passive RF microcircuit when the switch is thrown to the first pole, exclusively connecting the unlock passive RF microcircuit to the microantenna. A lock passive Radio Frequency microcircuit disposed in the key blade housing is operably connected to a second pole of the DPDT switch to activate the lock passive RF microcircuit when the switch is thrown to the second pole, exclusively connecting the lock passive RF microcircuit to the microantenna, The key supports remote/mechanical locking/unlocking of a vehicle door.

4 Claims, 2 Drawing Sheets

RFID-MECHANICAL DUAL-MODE ENTRY KEY

BACKGROUND OF THE INVENTION

1. Field of the Invention

The present invention relates to keyless entry systems, and particularly to an RFID-mechanical dual-mode entry key.

2. Description of the Related Art

Security systems for vehicles often include a security device for the vehicle entry system. Some vehicles use a radio frequency identification (RFD) system to lock and unlock the doors. Some vehicles use a remote keyless entry (RKE) system or a passive entry system in addition to the mechanical key to secure the vehicle doors. However, these systems are prone to hacking when a thief with the appropriate electronic equipment is positioned in a location near the person carrying the RKE key.

Thus, an RFID-mechanical dual-mode entry key solving the aforementioned problems is desired.

SUMMARY OF THE INVENTION

The RFID-mechanical dual-mode entry key includes a key blade attached to and extending away from a housing. A double pole double throw (DPDT) switch is disposed on the key blade housing. A microantenna disposed in the housing is connected to the switch. An unlock passive Radio Frequency microcircuit disposed in the key blade housing is operably connected to a first pole of the DPDT switch to activate the unlock passive RF microcircuit when the switch is thrown to the first pole, exclusively connecting the unlock passive RF microcircuit to the microantenna.

A lock passive Radio Frequency microcircuit disposed in the key blade housing is operably connected to a second pole of the DPDT switch to activate the lock passive RF microcircuit when the switch is thrown to the second pole, exclusively connecting the lock passive RF microcircuit to the microantenna. The key supports remote/mechanical locking/unlocking of a vehicle door. The microcircuits in the key housing are preferably passive tags in an Active Reader Passive Tag (ARPT) system where the active reader is disposed in a vehicle and transmits interrogator signals and also receives authentication replies from either of the passive tags in the key.

Designed as a remote car key, one passive tag microchip is for locking only, and the other one is for unlocking only. The user activates the appropriate tag by the DPDT selective switch. With the switch set to unlock, there is no need to press a button, since the reader inside the vehicle frequently performs a read interrogation. Short distant reading doesn't need much power, thereby saving power. The present invention key does not need a battery. It has a long life span. It is durable, waterproof, and when the switch is set to lock, hack-proof.

Moreover, the present RFID key can be designed with powerfully encrypted data transfer using virtually unlimited, long passwords, which are encrypted inside the RF microcircuitry chips.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figures 1A, 1B, 1C:
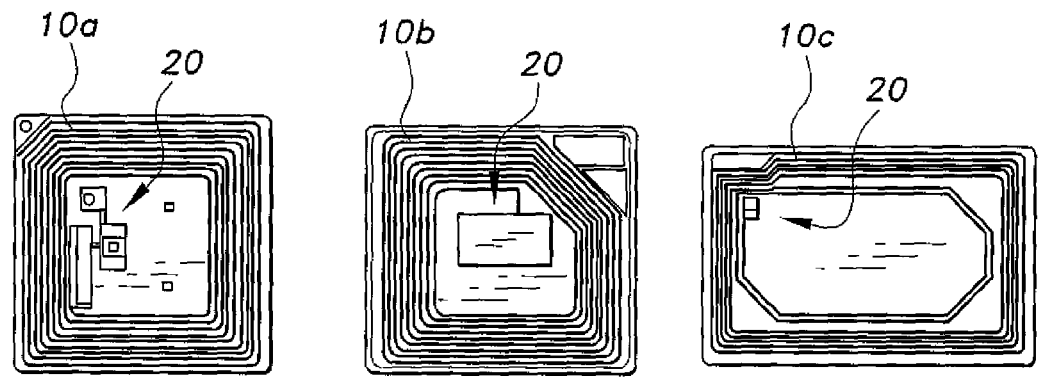
FIG. 1A is a top view of an RFID tag with a first antenna coil for an RFID-mechanical dual-mode entry key according to the present invention.
FIG. 1B is a top view of an alternative embodiment of an RFID tag for an RFID-mechanical dual-mode entry key according to the present invention with a second antenna coil.
FIG. 1C is a top view of another alternative embodiment an RFID tag for an RFID-mechanical dual-mode entry key according to the present invention with a third antenna coil.
Figure 2:
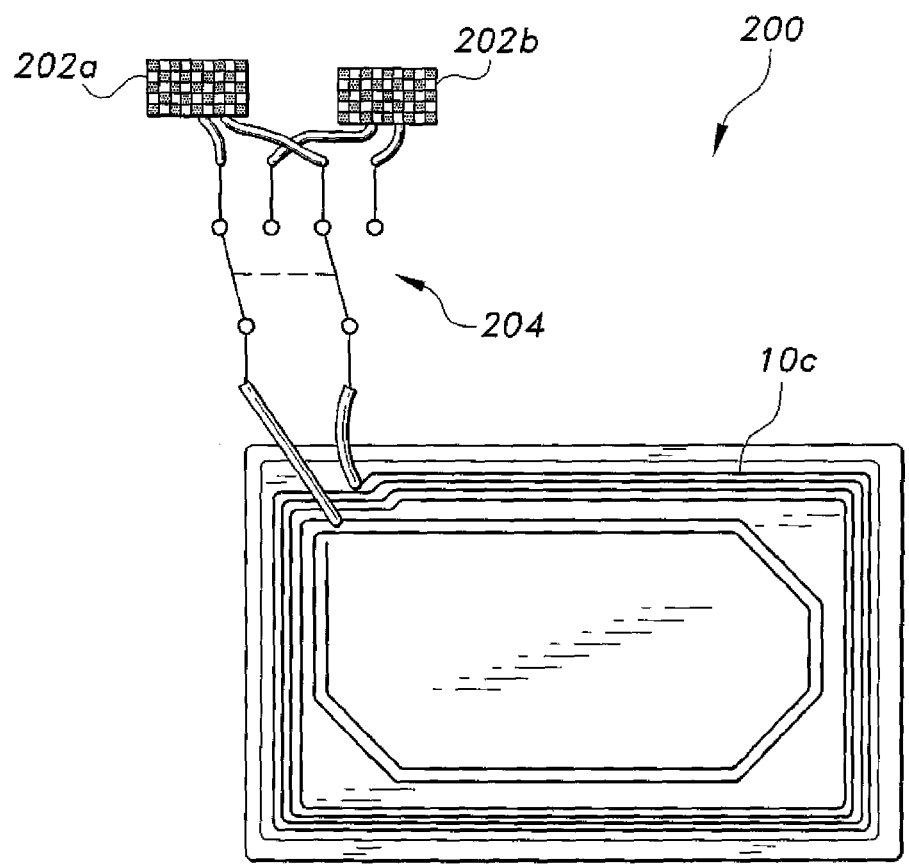
FIG. 2 is a diagram of the RFID key tag system for an RFID-mechanical dual-mode entry key according to the present invention, showing the selective switch connection.
Figures 3A, 3B:
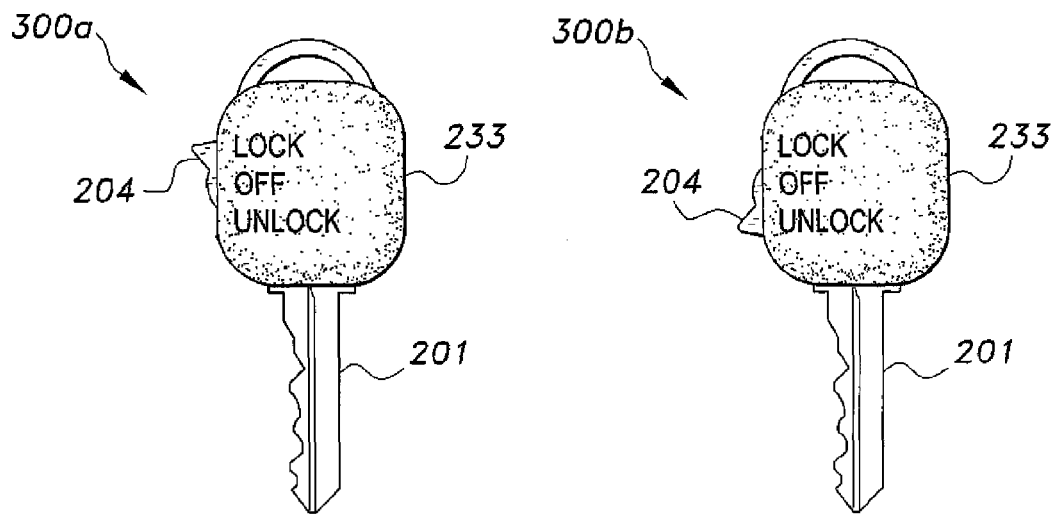
FIG. 3A is a front view of an RFID-mechanical dual-mode entry key according to the present invention, showing the RFID key in the unlock position.
FIG. 3B is a front view of an RFID-mechanical dual-mode entry key according to the present invention, showing the RFID key in the lock position.

FIGS. 1A-1C, 2, 3A-3B, and 4 detail the RFID-mechanical dual-mode entry key 200, which is a key for optional use with either a mechanical vehicle entry system or an RFID vehicle entry system. The key 200 includes a mechanical blade 201 capable of being received by a door lock of the mechanical vehicle entry system. The key blade 201 is attached to and extends away from a housing 233. A double-pole, double-throw (DPDT) switch 204 is disposed on the key blade housing 233. A microantenna (either 10a, 10b, or alternatively 10c) disposed in the housing 233 is connected to the switch 204. Dual passive RF transponders 20 disposed in the housing include an unlock passive Radio Frequency microcircuit 202a and a lock passive Radio Frequency microcircuit 202b. The unlock passive Radio Frequency microcircuit 202a is operably connected to a first pole of the DPDT switch 204 to activate the unlock passive RF microcircuit 202a when the switch 204 is thrown to the first pole, exclusively connecting the unlock passive RF microcircuit 202a to the microantenna 10c (as shown in FIG. 2). The lock passive Radio Frequency microcircuit 202b is operably connected to a second pole of DPDT switch 204 to activate the lock passive RF microcircuit 202b when the switch is thrown to the second pole, exclusively connecting the lock passive RF microcircuit 202b to the microantenna 10c. Thus, the key 200 supports remote/mechanical locking/unlocking of a vehicle door. FIG. 3A shows the key with the switch 204 in an unlock position 300a. FIG. 3B shows the key with the switch 204 in a lock position 300b.

The dual RF transponders 20 make the system less vulnerable to code thieves, since at any time, only the unlock coded transponder 202a or only the lock coded transponder 202b is connected to the antenna 10c. A biasing member, e.g., spring loading, may be employed to bias the key switch 204 in the lock position so that nearby code thieves might only retrieve the lock code, which would be useless for unauthorized vehicle entry. Moreover, the key switch 204 could be biased in a neutral position in which neither transponder 202a nor 202b is connected to the antenna 10c, making it even more difficult for an unauthorized interrogation transceiver to acquire the codes of system 200.

Figure 4:
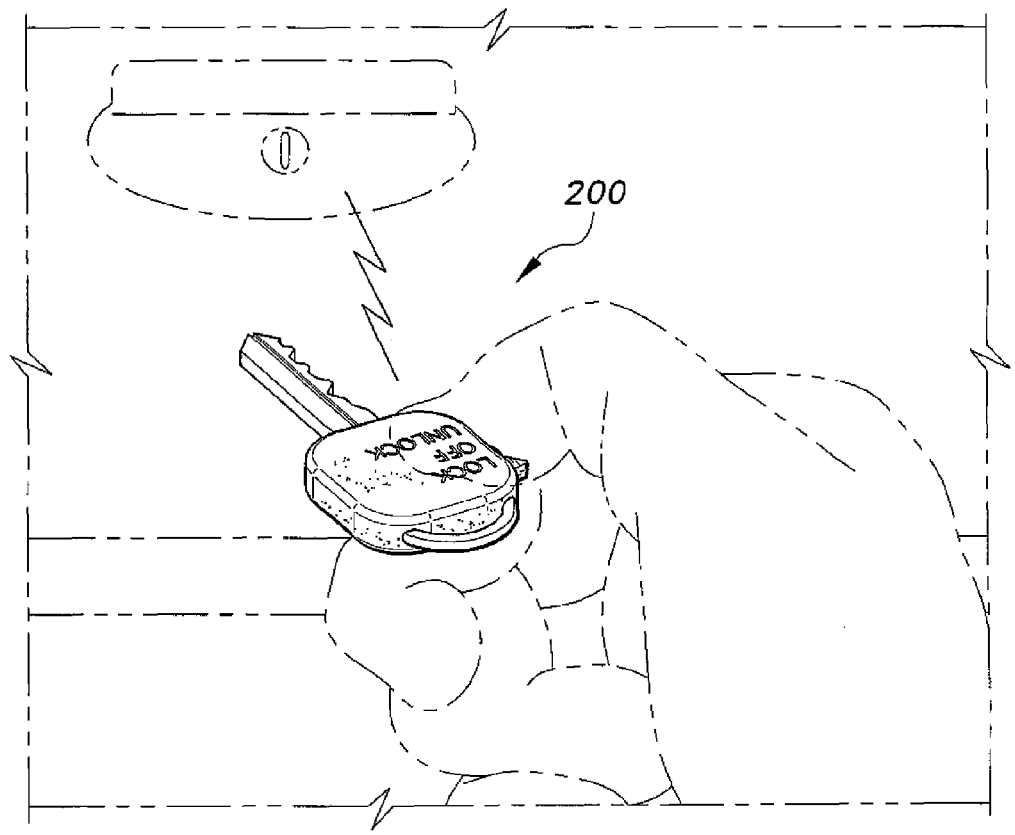
FIG. 4 is an environmental perspective view of an RFID-mechanical dual-mode entry key according to the present invention.

FIG. 4 is a perspective view illustrating a user with the key system 200 in proximity to the user's vehicle. The vehicle's RFID interrogation transceiver can be located within a keyless entry module of the vehicle. The vehicle RFID transceiver is connected to an antenna and may be located in the vehicle's keyless entry module or in any other suitable location within the vehicle, such as in the steering column. The vehicle RFID transceiver is operably connected to the vehicle's keyless entry module to control locking and unlocking of a vehicle compartment door according to interrogation response received from an authorized RFID tag, such as unlock coded transponder 202a or lock coded transponder 202b.

Each of the dual RF transponders 202a, 202b can combine a random number with its own unique serial number to encrypt a new number. The new encrypted number can be transmitted back to the vehicle's interrogation RFID transceiver. If the encrypted number does not match an authorized number stored in the vehicle's keyless entry module, the key 200 cannot be used to actuate the keyless entry system and the door will not unlock. If the encrypted number matches the authorized number stored in the vehicle's keyless entry module, the key 200 can be used to lock/unlock the door as desired by the user. An exemplary RFID interrogation system installed and operable with a module in a vehicle is detailed in U.S. Pat. Publication No. 2006/0266089, published on Nov. 30, 2006, which is incorporated by reference in its entirety herein.

It is to be understood that the present invention is not limited to the embodiments described above, but encompasses any and all embodiments within the scope of the following claims.

I claim:

1. A key for use with a dual-mode mechanical and a radio frequency identification vehicle entry system, the key comprising:

a mechanical blade, formed of a first material, capable of being received by a lock cylinder of the vehicle entry system;

a housing, formed of a second material, the housing couple to the mechanical blade;

wherein the mechanical blade extends from the housing and the housing serves as a handle for the blade;

a microantenna having a pair of connectors disposed in the housing;

a first microcircuit having a pair of connectors disposed in the housing, the first microcircuit being selectively and operably connected to the microantenna;

a second microcircuit having a pair of connectors disposed in the key blade housing, the second microcircuit being selectively and operably connected to the micro antenna;

a double pole, double throw switch disposed in the housing, the double pole, double throw switch having at least a first position and a second position;

wherein the double pole, double throw switch selectively switching the pair of connectors of the microantenna between the pair of connectors of the first microcircuit in the first position, and the pair of connectors of the second microcircuit in the second position;

whereby the selective and operable connections offer a closed passive circuit for the radio frequency identification vehicle entry system.

2. The key for use with a dual-mode mechanical and a radio frequency identification vehicle entry system according to claim 1, wherein the first microcircuit includes a passive transponder for acknowledging an unlock code to the dual-mode mechanical and a radio frequency identification vehicle entry system.

3. The key for use with a dual-mode mechanical and a radio frequency identification vehicle entry system according to claim 1, wherein the second microcircuit includes a passive transponder for acknowledging a lock code to the dual-mode mechanical and a radio frequency identification vehicle entry system.

4. The key for use with a dual-mode mechanical and a radio frequency identification vehicle entry system according to claim 1, wherein the first material of the mechanical blade is different from the second material of the housing;

the microantenna, and the first and second microcircuits are integrally molded in the second material; and the double pole, double throw switch is externally movable is the second material.

* * * * *